Patented Nov. 13, 1945

2,388,688

UNITED STATES PATENT OFFICE 2,388,688

RESOLUTION OF ENANTIOMORPHS

Henry B. Hass, West Lafayette, Ind., assignor to Purdue Research Foundation, La Fayette, Ind., a corporation of Indiana No Drawing. Application July 18, 1941, Serial No. 403,075

14 Claims. (Cl. 260—535)

This invention relates to a method for the separation or resolution of enantiomorphs. It relates in particular to a method whereby liquid racemic mixtures may be at least partially resolved by converting such racemic mixtures to volatile diastereoisomeric mixtures, rectifying the diastereoisomers, and recovering optically active fractions of the original racemic mixture therefrom. Diastereoisomers are compounds which are stereoisomers but not enantiomorphs.

It is well known that many compounds are potentially optically active by virtue of the presence therein of an asymmetric atom which may be, for example, either carbon, quinquivalent nitrogen, selenium, tin or the like. Certain other compounds are optically active without containing any asymmetric atom, optical activity being ascribed to molecular asymmetry. When produced by methods of chemical synthesis, however, most such compounds prove to be optically inactive, i. e., they are composed of equimolar amounts of the dextrorotatory and levorotatory enantiomorphs. Such inactive mixtures, known as racemic mixtures, often cannot be resolved into their respective $d$ and $l$ isomers by simple procedure, in all cases the isomers have identical boiling points, and no practical rectification method has as yet been applied successfully to such a separation of volatile racemic mixtures.

The present invention is based upon, and verifies, a presumption that racemic mixtures may be caused to react with a different, and optically active compound, to form diastereoisomers of different boiling points. This may be explained simply, thus:

$dl$ form of $A + d$ form of $B$ (reactive with $A$) →
$$dlAB + ddAB$$
or
$dl$ form of $A + l$ form of $B$ (reactive with $A$) →
$$dlAB + llAB$$

It is presumed, further, and will be shown hereinafter, that when AB is a volatile compound, the $ddAB$ or the $llAB$ may be separated by rectification from the inactive $dlAB$, and then, by suitable re-conversion to A and B, an optically active form of A may be obtained.

The invention, then, is a method of resolving mixtures of enantiomorphic organic compounds, which comprises reacting the mixture with an optically active compound to form a mixture of volatile diastereoisomeric esters or addition compounds, rectifying the said volatile product, and recovering optically active fractions of the original enantiomorphic mixture after saponification or other chemical reaction capable of yielding the original compound when carried out on the rectified diastereoisomer.

The method has particularly advantageous application in the resolution of racemic acids, alcohols, and acid halides or readily hydrolyzed hydrocarbon halides, as these can be converted by reaction with appropriate optically active compounds into volatile diastereoisomeric esters, ethers, acetals, or amines, which, in turn, can be rectified and reconverted by known methods to the said alcohols, acids, or halides which have thereby undergone at least partial resolution to an optically active form.

Examples of stereoisomeric compounds containing asymmetric carbon atoms which may be of the present invention include such alcohols as 2-butanol, 2-pentanol, 2-methyl-1-butanol, 3-methyl-1-butanol, 2-ethyl-1-butanol, 3-methylcyclohexanol, 2-ethyl-1-hexanol, and numerous others. Acids which may be resolved at least partially by the method of the invention are the enantiomorphic mixtures of 2-hydroxypropanoic acid, and ethers thereof, 2-methylbutanoic acid, 2-acetoxy-propanoic acid, 2-chloropropanoic acid, 2-chlorobutanoic acid, and any of numerous others containing an asymmetric carbon atom. The acid halides of such racemic acids may be separated into optically active components, as may the hydrolyzable halides, formed for example, by hydrohalogenation of the alcohols above suggested.

In a preferred form of the invention, a mixture of stereoisomeric alcohols is esterified using an optically active acid. Let it be assumed, for the sake of description, that the acid is dextrorotatory. The so-formed diastereoisomeric mixture of esters contains molecules wherein the alcohol residue is from a dextrorotatory alcohol and the acid radical is dextrorotatory. Such a configuration we may call $dd$. There are also molecules of inactive $ld$ esters present. Rectification of the mixture, with constant observation of the optical activity of the distillate, results in separation of the active from the inactive diastereoisomers. The active fraction is saponified, and the dextrorotatory alcohol is recovered. The spread in boiling range between the diastereoisomeric esters may be very small or it may be one of several degrees. Depending, therefore, on the efficiency of the rectifying system, a complete or a partial separation of the original alcohol into its respective enantiomorphs may be obtained.

The method is effective not only to separate an optically active isomer from an inactive racemic mixture, but also to increase the proportion of one of the isomers which may already be present in excess. Thus, treatment, as above-described, of a dextrorotatory mixture of 60 parts of $d$ 2-butanol and 40 parts of $l$ 2-butanol with $d$ 2-hydroxypropanoic acid, rectification of the diastereoisomeric butyl lactates, and saponification of the dextrorotatory fractions yields an alcohol mixture much richer than formerly in $d$ 2-butanol.

In forming the diastereoisomers to be separated by rectification, it is preferred, but not essential, that the optically active reagent employed ($d$ 2-hydroxypropanoic acid in the outline example, supra) be as nearly as possible a single optical isomer. It is possible, however, to effect a separation when the optically active reagent has only slight excess of one of its enantiomorphs over the other. The efficiency of the method is in direct proportion to the amount of excess of one isomer over the other in the optically active reagent.

The progress of the rectification of the diastereoisomeric esters may be traced continually by means of a polarimeter or equivalent means for observing the optical rotatory powers of liquids. This is especially important when resolving mixtures whose diastereoisomeric esters boil over a very slight temperature range, as change in optical properties of the distillate may be traced more accurately than minute changes in boiling point.

The following examples illustrate the practice of the invention, but are not to be construed as limiting the invention to the embodiments described:

Example 1

A concentrated solution of $d$-lactic acid was prepared by (1) fermentation of sterilized whey with *Streptococcus lactus* in the presence of sterilized calcium carbonate, (2) removal of calcium carbonate after fermentation, (3) acidification with sulfuric acid, (4) filtration to remove calcium sulfate, (5) evaporation, and (6) clarification with decolorizing charcoal. This acid was used to esterify racemic 2-butanol. There was used 1500 ml. of the 2-butanol (B. P. 99° C.), and 1600 ml. of the viscous $d$-lactic acid. These reagents were heated with 500 ml. of benbene and 10 ml. of concentrated sulfuric acid. The aqueous benzene distillate was continuously separated and benzene returned to the reaction vessel until 250 ml. of water had been recovered from the esterification. The product was fractionated and sec. butyl lactate (B. P. 83-85° C. at 20 mm.) collected. To 120 ml. of this fraction was added dropwise 90 ml. of propionyl chloride. The mixture was refluxed 15 minutes, washed with sodium carbonate solution, and the alpha-methyl-propyl-2-propionoxypropionate so formed was obtained by rectification, boiling at 110-111° C. at 25 mm. About 140 ml. of the diastereoisomeric mixture of this ester was rectified in a column having 60 theoretical plates at 35 mm. under conditions such that 3 ml. of distillate was recovered every two hours. During rectification, the specific rotation of the distillate changed from —42.5° to 26.0°. The first 20 percent of the distillate was saponified with 25 per cent sodium hydroxide solution and a constant boiling (87-88° C.) mixture of 2-butanol and water was recovered. The mixture had a specific rotation of —3.75°, and the $l$-2-butanol had a specific rotation of —6.77°. In like manner the last 15 per cent of the distillate was saponified and a 2-butanol-water mixture obtained. This was dried and 1.6 grams of the optically active product was dissolved in 8.4 grams of racemic 2-butanol. The mixture had a specific rotation of +9.8°, and the 2-butanol in the last portion of the distillate contained 86 per cent of $d$-2-butanol, based on the value of +13.84° reported for this material in International Critical Tables, vol. 7, p. 366. Substantial resolution of $dl$-2-butanol to $d$-2-butanol and $l$-2-butanol had thus been obtained.

Example 2

It was desired to produce $d$-2-methoxypropanoic acid and $l$-2-methoxypropanoic acid. This was accomplished by resolution of the menthyl ester of 2-methoxypropanoic acid. In one instance, this menthyl ester was prepared by heating methanol for 2 hours under reflux, with 2-chloro-propionyl chloride, to form methyl-2-chloropropanoate (B. P. 125-135° C.), and methylating this product with a methanol solution of sodium methoxide to form methyl-2-methoxypropanoate (B. P. 129-130° C.), which, in turn, was esterified with $l$-menthol in the presence of 4N sulfuric acid as a catalyst. The diastereoisomeric menthyl ester boiled at 120° C. at 7 mm. This product was rectified very carefully in a 60-plate column at 13 mm., and the specific rotation varied continually during rectification from —65.4° to —49.5°. The first and last 40 per cent fractions were separately saponified with alcoholic sodium hydroxide, extracted with ether after the alcohol had been removed, acidified with hydrochloric acid, and again taken up in ether. The separated fractions of 2-methoxypropanoic acid (B. P., about 175-185° C.) were each recovered by distillation. That from the first 40 per cent cut of menthyl 2-methoxypropanoate had a specific rotation of —10.0°. Substantial resolution into the respective enantiomorphs had occurred.

Example 3

Racemic 2-butanol was partially resolved through rectification of its lactic acid ester, made from a commercial lactic acid which was dextrorotatory, but had only a slight excess of $d$-lactic acid over the $l$-lactic acid present, as was shown by examination of its ethyl ester which had a specific rotation of +2.6° as compared with pure $d$-ethyl lactate at +14.52°. The diastereoisomeric secondary butyl lactates formed boiled at 97-98° C. at 50 mm. Rectification of this mixture through a 60-plate column gave a progressively varying specific rotation in the distillate, from +2.2° to —0.8°. The first and last 40 per cent fractions were separately saponified with 30 per cent sodium hydroxide solution containing about 3.5 per cent of castile soap. Each mixture was steam-distilled and the recovered alcohol was dried over anhydrous copper sulfate and redistilled. They boiled between 97° and 99° C., and exhibited, respectively, specific rotations of +0.6° and —0.6°. Since the original lactic acid employed had an excess of only about 20 per cent $d$-lactic acid over the $l$-lactic acid, the resolution obtained here was about 30 per cent of that theoretically possible.

Example 4

Racemic 2-butanol was resolved in similar manner, and with similar results, after esterification with $d$-2-acetoxypropanoic acid. Rectification of sec. butyl 2-acetoxypropanoate (B. P. 91°-92° C.

at 18 mm., density 0.9883 g./ml. at 20° C.) was accompanied by a change in specific rotation from +9.5° to +6.1°. Optically active samples of 2-butanol were obtained with specific rotations of +0.7° and —0.7°.

Example 5

In like manner, racemic 2-pentanol was partially resolved, through its diastereoisomeric lactates, prepared from the lactic acid described in Example 3. The esters, during rectification, were fractionated into portions having specific rotations of +2.0° and +0.5°. Optically active 2-pentanol (B. P. 117°–119° C.) was recovered from its ester by saponification.

Example 6

Racemic 2-methylbutanoic acid (B. P. 175°–177° C.) partially resolved, after formation of its esters with 2-methylbutanol) specific rotation —5.7°, and rectification of those esters. The specific rotation of the esters increased during rectification from +2.0° to +3.3°. Saponification of the first and last 40 per cent fractions, and acidification of the product, yielded samples of 2-methylbutanoic acid having specific rotations of —0.4° and +0.4° respectively.

Example 7

In an analogous manner to that previously described, racemic 2-ethyl-1-hexanol was resolved by rectification of its 2-methylbutanoic acid esters, made from an optically active 2-methylbutanoic acid. The esters changed in rotation from +8.4° to +7.6° during rectification. Optically active 2-ethyl-1-hexanols were recovered from the fore and end fractions.

In a manner similar to that described in the examples numerous other compounds containing an asymmetric atom were at least partially resolved into their optically active components by conversion into diastereoisomers containing two asymmetric atoms, rectification of the diastereoisomers and liberation, from the fore-and tail-fractions thereof, of optically active forms of the original racemic compound or a simple chemical derivative thereof. The invention is not limited in its application to the resolution of the compounds named, nor necessarily to the separation of enantiomorphs by rectification of diastereoisomeric esters, since volatile diastereoisomeric ethers, acetals, amines, and the like, capable of being rectified and of yielding on re-conversion, the desired compound without destroying the asymmetry thereof, may be similarly employed. The purer the optically active reagent employed to make the diastereoisomers to be rectified, the more complete is the resolution of the racemic mixture being acted upon. Other methods which may be employed in effecting resolution of enantiomorphs, according to the principle underlying the method herein described are: (1) counter-current adsorption from liquid-phase; and, (2) counter-current adsorption from vapor-phase. All of these methods comprise the steps of converting a mixture of enantiomorphs to diastereoisomers, separating the diastereoisomers by a counter-current process and converting the diastereoisomers to the original enantiomorphs which have thus been at least partially separated.

I claim:

1. A method which comprises subjecting to rectification a mixture of diastereoisomers composed of a compound having two characterizing groups each containing an asymmetric atom of opposite light rotating tendencies and a like compound wherein the two asymmetric atoms have the same light rotating tendencies, separating fractions during rectification having different specific rotations, reacting upon one of said fractions to decompose the diastereoisomer with the formation of two optically active compounds each containing one of said characterizing groups, and separating therefrom the one of said optically active compounds whose characterizing group originally was present in two enanthiomorphic forms.

2. A method of effecting at least partial resolution of a mixture of enantiomorphs containing an asymmetric atom, which comprises reacting said mixture with an optically active compound so as to produce by a reversible reaction a mixture of volatile diastereoisomeric compounds capable of being distilled and of being subjected to the reverse reaction without destroying the asymmetry of the active atoms therein, rectifying the mixture of diastereoisomers, separating therefrom fractions having different specific rotations, subjecting one of said fractions to the reverse reaction, and recovering an optically active product containing more of one of the original enantiomorphs relative to the other than had the original mixture subjected to treatment.

3. A method of effecting at least partial resolution of a mixture of enantiomorphic alcohols, which comprises esterifying said mixture with an optically active monocarboxylic acid capable of forming a volatile ester with said alcohol, thereby to form a volatile mixture of diastereoisomeric esters, rectifying the said mixture, separating therefrom fractions having different specific rotations, saponifying one of said fractions, and recovering from the saponified product an optically active form of the original alcohol.

4. A method of effecting at least partial resolution of a racemic mixture of enantiomorphic alcohols, which comprises esterifying said mixture with an optically active monocarboxylic acid capable of forming a volatile ester with said alcohol, thereby to form a volatile mixture of diastereoisomeric esters, rectifying the said mixture, separating therefrom fractions having different specific rotations, saponifying one of said fractions, and recovering from the saponified product an optically active form of the original alcohol.

5. A method of effecting at least partial resolution of a mixture of enantiomorphic monocarboxylic acids, which comprises esterifying said mixture with an optically active monohydric alcohol capable of forming a volatile ester with said acid, thereby to form a volatile mixture of diastereoisomeric esters, rectifying the said mixture, separating therefrom fractions having different specific rotations, saponifying one of said fractions, and recovering from the saponified product an optically active form of the original acid.

6. A method of effecting at least partial resolution of a racemic mixture of enantiomorphic monocarboxylic acids, which comprises esterifying said mixture with an optically active monohydric alcohol capable of forming a volatile ester with said acid, thereby to form a volatile mixture of diastereoisomeric esters, rectifying the said mixture, separating therefrom fractions having different specific rotations, saponifying one of said fractions, and recovering from the saponified product an optically active form of the original acid.

7. The method as claimed in claim 3, wherein the alcohol to be resolved is 2-butanol.

8. A method of effecting at least partial resolution of a racemic mixture of enantiomorphic 2-butanols, which comprises esterifying said mixture with an optically active 2-substituted propanoic acid capable of forming volatile secondary butyl esters, thereby to form a volatile mixture of diastereoisomeric secondary butyl esters of the 2-substituted propanoic acid, rectifying the said mixture, separating therefrom fractions having different specific rotations, saponifying at least one of the fore- or tail-fractions, and recovering from the saponified product an optically active form of 2-butanol.

9. The method as claimed in claim 8, wherein the optically active acid employed is $d$-2-hydroxypropanoic acid.

10. The method as claimed in claim 5, wherein the acid to be resolved is 2-methoxypropanoic acid.

11. The method as claimed in claim 5, wherein the acid to be resolved is 2-methoxypropanoic acid and the optically active alcohol employed is 1-menthol.

12. The method as claimed in claim 3, wherein the alcohol to be resolved is 2-pentanol.

13. The method as claimed in claim 3, wherein the alcohol to be resolved is 2-pentanol and the optically active acid employed is a 2-substituted propanoic acid.

14. The resolution of a mixture of enantiomorphs by reacting the same with an optically active compound to produce a mixture of diastereoisomeric compounds, subjecting said product to a counter-current adsorption treatment to separate at least partially the diastereoisomers, and converting the separated diastereoisomers to their respective original enantiomorphs.

HENRY B. HASS.